(12) United States Patent
Patterson (10) Patent No.: US 6,533,344 B1
(45) Date of Patent: Mar. 18, 2003

(54) BED COVER FOR PICKUP TRUCK

(76) Inventor: James Harold Patterson, 14991 Big Oak Bay Rd., Tyler, TX (US) 75707

( * ) Notice: Subject to any disclaimer, the term of this patent is extended or adjusted under 35 U.S.C. 154(b) by 0 days.

(21) Appl. No.: 09/689,040

(22) Filed: Oct. 12, 2000

(51) Int. Cl.$^7$ .................................................. B60P 7/02
(52) U.S. Cl. ................ 296/100.06; 296/100; 296/100.1
(58) Field of Search ....................... 296/100.06, 100.07, 296/100.09, 100.1, 100.02, 100, 39

(56) References Cited

U.S. PATENT DOCUMENTS

| | | | | |
|---|---|---|---|---|
| 4,324,429 A | * | 4/1982 | Wilson et al. | ............... 296/100 |
| 4,469,364 A | | 9/1984 | Rafi-Zadeh | |
| 4,531,775 A | | 7/1985 | Beals | |
| 4,550,945 A | * | 11/1985 | Englehardt | ................... 296/100 |
| 4,733,898 A | * | 3/1988 | Williams | .................... 296/39 |
| 4,824,163 A | * | 4/1989 | Hendrych | ................... 296/100 |
| 4,830,242 A | | 5/1989 | Painter | |
| 4,844,305 A | | 7/1989 | McKneely | |
| 5,018,778 A | * | 5/1991 | Goble | ....................... 296/37.6 |
| 5,239,934 A | * | 8/1993 | Miller et al. | ................ 296/241 |
| 5,322,336 A | * | 6/1994 | Isler | ............................ 296/100 |
| 5,329,979 A | * | 7/1994 | Miller et al. | ................ 296/74.1 |
| 5,403,061 A | * | 4/1995 | Micknowicz | ............... 296/100 |
| 5,509,709 A | | 4/1996 | Carroll | |
| 5,685,593 A | | 11/1997 | O'Connor | |
| 5,687,895 A | | 11/1997 | Allison et al. | |
| 5,704,681 A | * | 1/1998 | Lambden | .................... 296/100 |
| 5,743,586 A | | 4/1998 | Nett | |
| 5,882,058 A | | 3/1999 | Karrer | |
| 5,909,921 A | * | 6/1999 | Nesbeth | .................... 296/100.1 |
| 5,957,525 A | * | 9/1999 | Nelson | .................. 296/100.06 |
| 5,988,722 A | | 11/1999 | Parri | |
| 6,042,173 A | | 3/2000 | Nett | |
| 6,203,097 B1 | * | 3/2001 | Podgorney | ................... 296/170 |

OTHER PUBLICATIONS

Unknown, CoverCraft 1999 Catalog, pp. 16–19, cover and back, Dec. 31, 1999.

* cited by examiner

Primary Examiner—Kiran Patel
(74) Attorney, Agent, or Firm—Mark D Perdue (57) ABSTRACT

A generally laminar cover member extends between the sidewalls, end wall, and tailgate of the bed of a pickup truck and is removably secured to at least one of the sidewalls and end wall. The cover member is formed of a rigid material adapted to bear a load and is secured to the sidewalls in a location to leave at least 75% of the bed volume under the cover usable for storage. At least one leg member is secured to one side of the cover member, the leg members being selectively extendable to permit use of the cover as a table when the cover is removed from the bed of the pickup truck.

18 Claims, 15 Drawing Sheets

BED COVER FOR PICKUP TRUCK

BACKGROUND OF THE INVENTION

1. Field of the Invention

The present invention relates to coverings for the beds of pickup trucks and similar vehicles. More particularly, the present invention relates to bed covers that are sufficiently rigid to permit the cover to bear a load while the cover leaves a majority of the bed volume under the cover unobstructed and usable.

2. Summary of Prior Art

For many years, covers have been sold for the beds of pickup trucks for aesthetic and functional reasons. The most common of these covers is the tonneau cover, which is usually formed of fabric and secured to the bed of the truck, above the floor and usually at the top of the bed walls, by grommets, elastic cords, and the like. Clearly, while a fabric cover may protect the bed and its contents from the elements, it is not well adapted to secure the bed against unauthorized entry and theft or vandalism to the contents.

Accordingly, the prior art discloses a number of rigid covers for pickup truck beds. For example, U.S. Pat. No. 5,988,722, to Parri, discloses a bed cover having a rigid platform mounted on slides. U.S. Pat. No. 5,882,058, to Karrer, discloses a bed enclosure using several covers to enclose the bed of a truck. U.S. Pat. No. 5,509,709, to Carroll, discloses a rigid cover adapted to carry loads in conjunction with stake sides. U.S. Pat. No. 5,018,778, to Goble, discloses a bed cover adapted for converting the bed of a pickup into a dog kennel with a tent or covered sitting area above. U.S. Pat. No. 4,531,775, to Beals, discloses a rigid, load bearing cover that locks.

Other patents disclose storage units adapted to partition or otherwise make use of bed space that have the incidental effect of providing a rigid top or cover for the storage device(s). Such apparatus are found in U.S. Pat. No. 4,469,364, to Rafi-Zadeh; U.S. Pat. No. 4,844,305, to McKneely; and U.S. Pat. No. 5,687,895 to Allison, et al. Each of these devices interferes with the original volume of the bed, which is their intended function.

U.S. Pat. Nos. 5,329,979 and 5,239,934, to Miller et al., disclose a storage device for a pickup that can be removed from the bed and is provided with legs so that the device can function as a work table. Similar is U.S. Pat. No. 4,733,898, to Williams, which discloses a device that provides drawers in the bed that can be used as work tables.

A commercial rigid bed cover is sold by Covercraft Industries of Pauls Valley, Okla. as the "Hardshell Tonneau Cover" and is disclosed in U.S. Pat. Nos. 6,042,173 and 5,743,586, to Nett. This cover is hinged at the forward or end wall of the pickup bed, but is not easily removed and cannot function as a table when removed.

A need exists, therefore, for a pickup truck bed cover that is rigid and capable of bearing a load (so that the flat portion of the bed cover remains useful), does not interfere with the use of the majority of the bed volume, is easily removed from the pickup bed, and can be used as a table when removed from the pickup bed.

SUMMARY OF THE INVENTION

It is a general object of the present invention to provide an improved bed cover for the bed of a pickup truck. The bed of the pickup has a pair of parallel, spaced-apart, upstanding sidewalls, a tailgate extending transversely between the sidewalls at one end, and an end wall extending between the sidewalls at an end opposite the tailgate. The sidewalls, end wall and tailgate define a bed volume, which is a useful part of the bed.

This object is achieved by providing a generally laminar cover member extending between the sidewalls, end wall, and tailgate and removably secured to at least one of the sidewalls and end wall. The cover member is formed of a rigid material adapted to bear a load and is secured to the sidewalls in a location to leave at least 75% of the bed volume under the cover usable for storage. A pair of leg members are secured to one side of the cover member, the leg members being selectively extendable to permit use of the cover as a table when the cover is removed from the bed of the pickup truck.

According to one embodiment of the present invention, the end wall is defined by a vertically extending portion of a toolbox disposed in the bed opposite the tailgate.

According to one embodiment of the present invention, the end wall is an integral portion of the pickup truck bed.

According to one embodiment of the present invention, the bed cover further comprises at least one hinge member, coupled to the cover member and extending along an axis of the bed to permit partial opening of the bed cover and access to the bed volume under the bed cover.

According to one embodiment of the present invention, the at least one hinge member further comprises a first hinge member connecting the bed cover to the end wall, a second hinge member extending transversely between the sidewalls and coupling a forward and a rear portion of the bed cover to one another, a third hinge member extending from the tail gate perpendicular to and intersecting the second hinge member to connect right rear and left rear portions of the cover member to one another.

According to one embodiment of the present invention, the first hinge member comprises a plurality of individual hinge members with removable hinge pins to permit it selective removal of the cover member from the bed.

According to one embodiment of the present invention, the cover member is formed of aluminum plate having a non-skid tread pattern formed on at least an upper surface thereof.

Other objects, features, and advantages of the present invention will become apparent with reference to the drawings and detailed description, which follow.

DETAILED DESCRIPTION OF THE INVENTION

Figure 1:
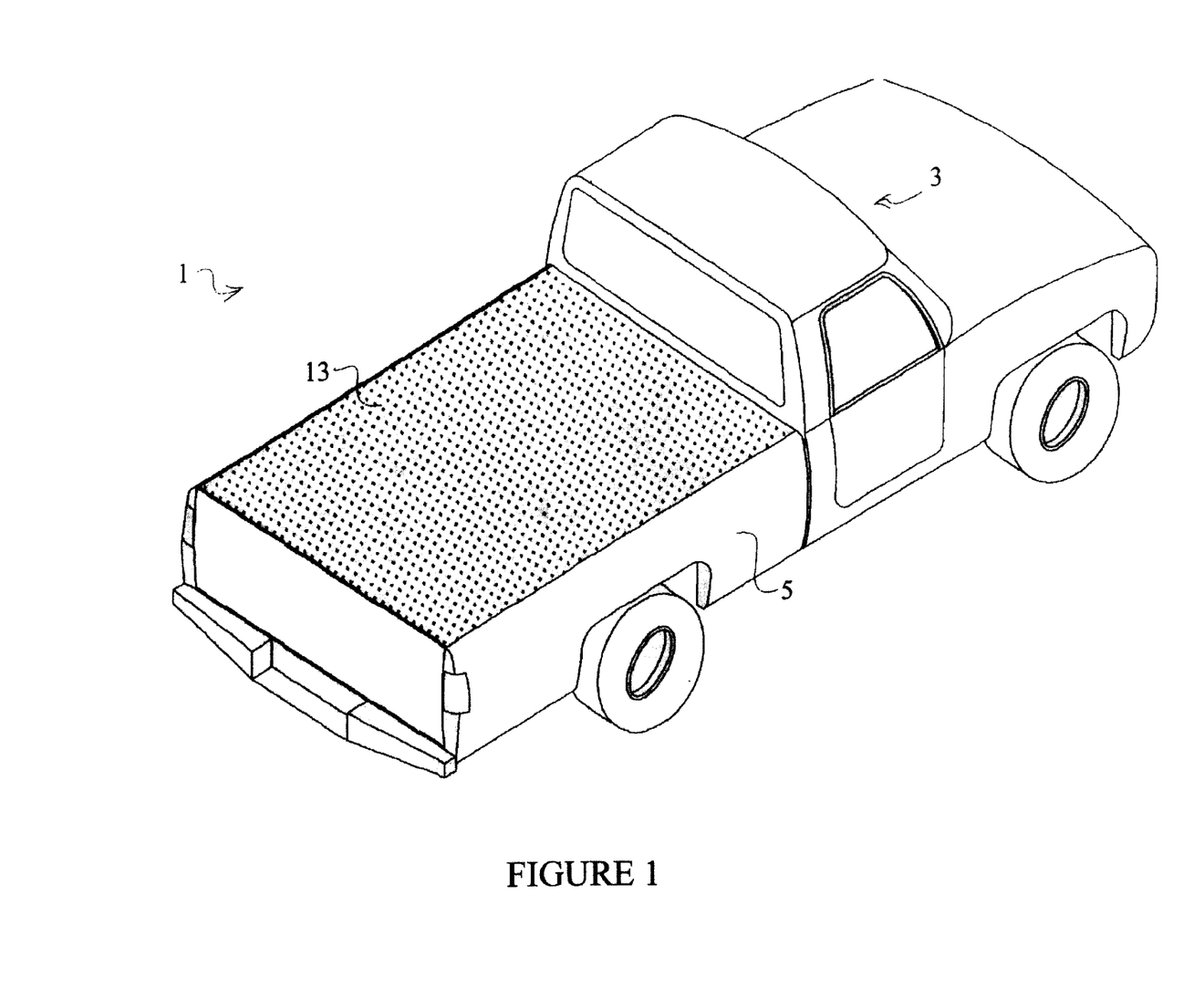
FIG. 1 is a perspective view of the rear portion of a conventional pickup, illustrating the bed cover according to the present invention.

Referring now to the Figures, and specifically to FIG. 1, a pickup truck 1 is illustrated. Pickup truck 1 includes a cab 3 for the passengers and a bed 5, which comprises a pair of upstanding, spaced-apart and parallel sidewalls 7, an end wall 9, and tail gate 11. The walls of the bed define a bed volume, which is a portion of the useful carrying capacity of pickup 1.

A bed cover 13 according to the present invention is disposed on and between the sidewalls 7, end wall 9, and tail gate 11, to cover the bed. According to the preferred embodiment of the present invention, the cover 13 is a laminar or sheet-like panel or cover member formed of 0.125" aluminum plate with a diamond non-skid pattern formed on at least the upper surface thereof. Tread Brite is a trade name for a preferred aluminum plate with diamond non-skid pattern. Bed cover 13 thus constructed is capable of bearing loads so that the horizontal surface provided by cover 13 is still useful for carrying loads even though the bed is covered. The edges of bed cover 13 are bent or rolled over or turned down to provide additional structural rigidity.

Preferably, cover 13 extends to cover the entire bed and is mounted flush with, or slightly above or below, the upper extent of the walls defining the bed. Thus, a majority of the useful volume of the bed below the plane defined by the upper extend of sidewalls 7, end wall 9, and tail gate 11, is preserved for storage or the like. Due to legs, bracing, hinges and other features (described below), it is impossible to preserve 100% of the volume of the bed, but it is preferable that 75 to 90% of the original bed volume be preserved.

Figure 2:
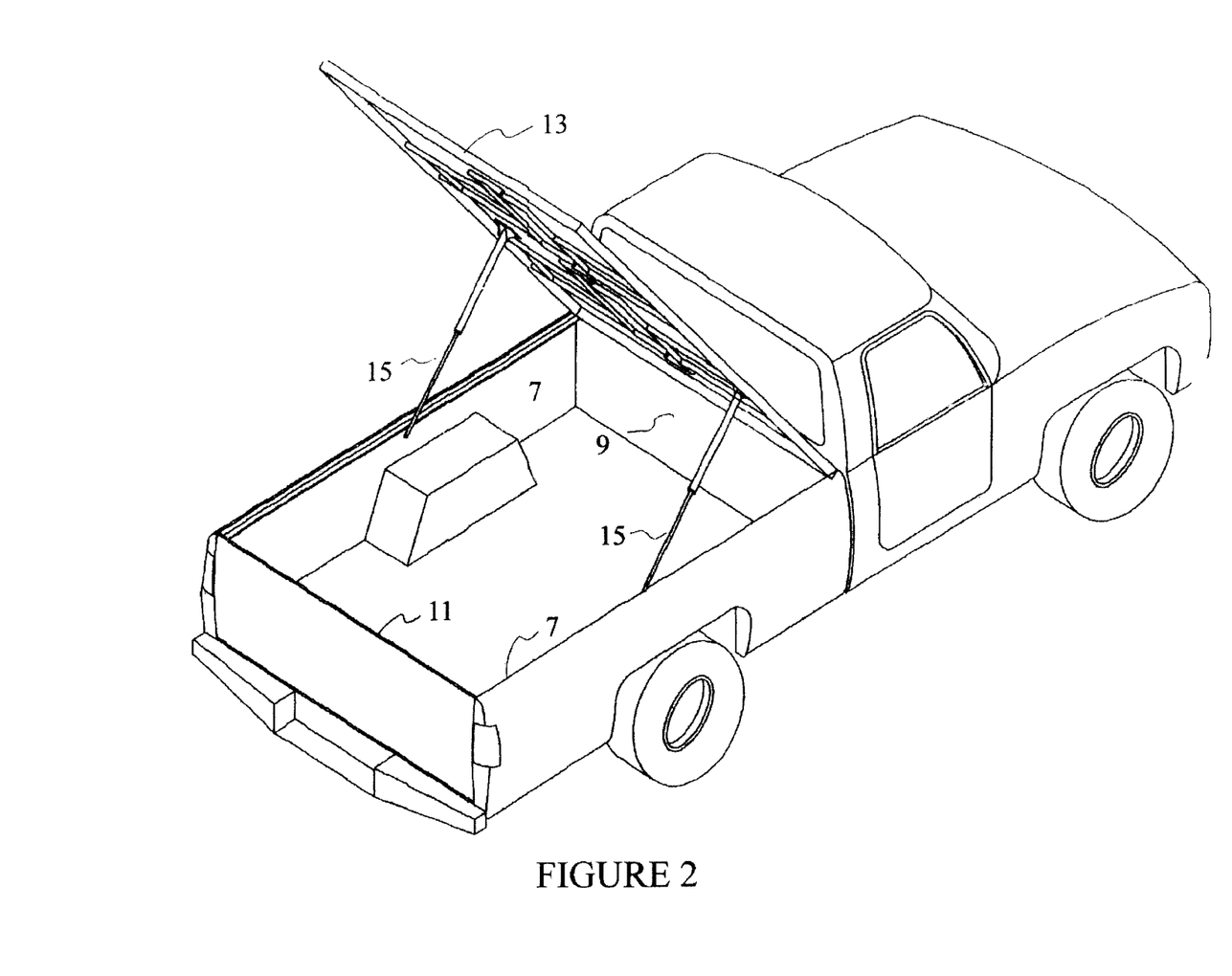
FIG. 2 is a perspective view of the rear portion of a conventional pickup, illustrating the bed cover according to the present invention in an open position.

As shown in FIG. 2, bed cover 13 is secured by a pair of conventional hinges to end wall 9, and can be opened along that hinged axis to permit access to the bed volume under cover 13. A pair of gas struts 15 is provided to assist in raising cover 13 to the open position and to maintain it there until cover 13 is closed. According to another embodiment of the present invention, cover 13 is divided into panels that are hinged along one or more axes of the bed to provide access from several directions.

Figure 3:
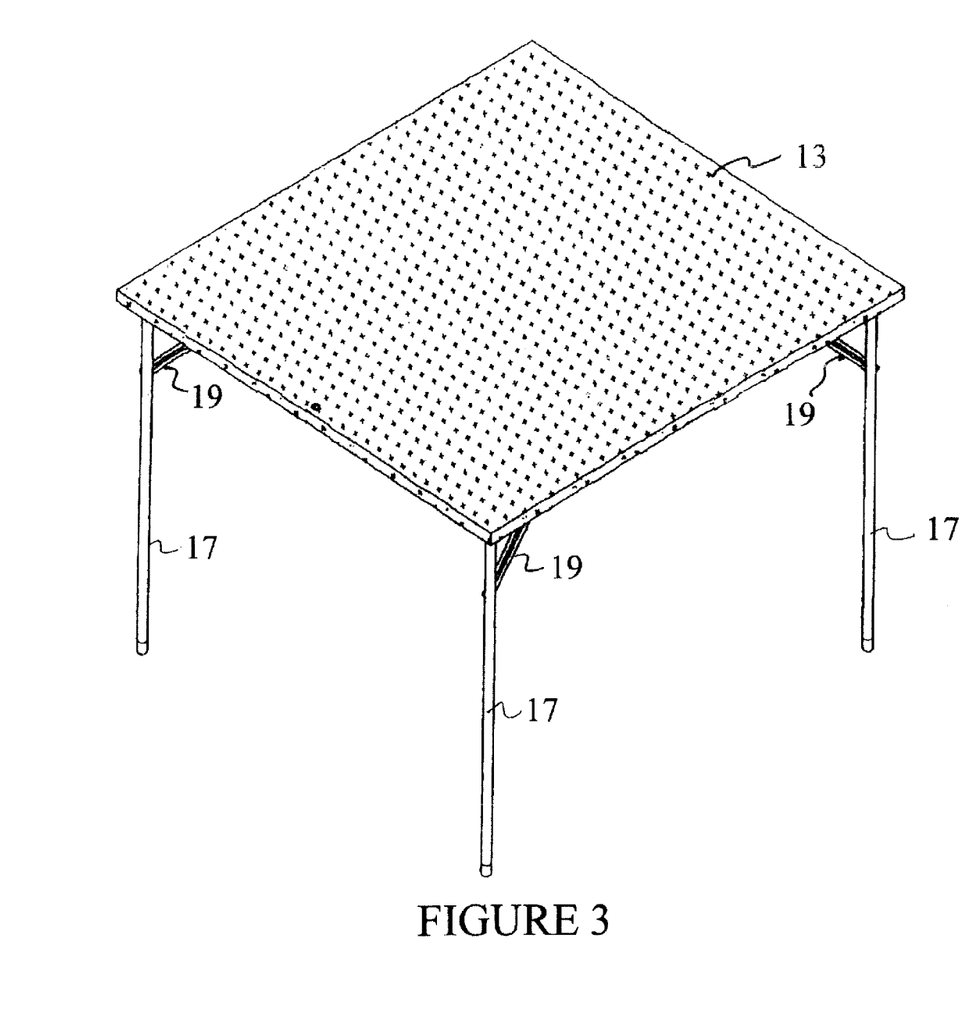
FIG. 3 is a perspective view of the bed cover according to the present invention removed from the pickup and with the legs extended to form a table.

FIG. 3 shows bed cover 13 removed from bed 5 with at least one, preferably four, leg members 17 extended so that bed cover 13 can be used as a work or picnic table when removed from the bed of pickup 1. Each leg 17 is provided with a brace 19 between the leg and cover member 13, and are hinged, so that legs 17 are selectively extendable from and collapsible relative to cover member 13. Although four legs 17 are preferred, any number or combination of leg arrangements suitable to convert cover 13 into a table is satisfactory.

Figures 4, 6:
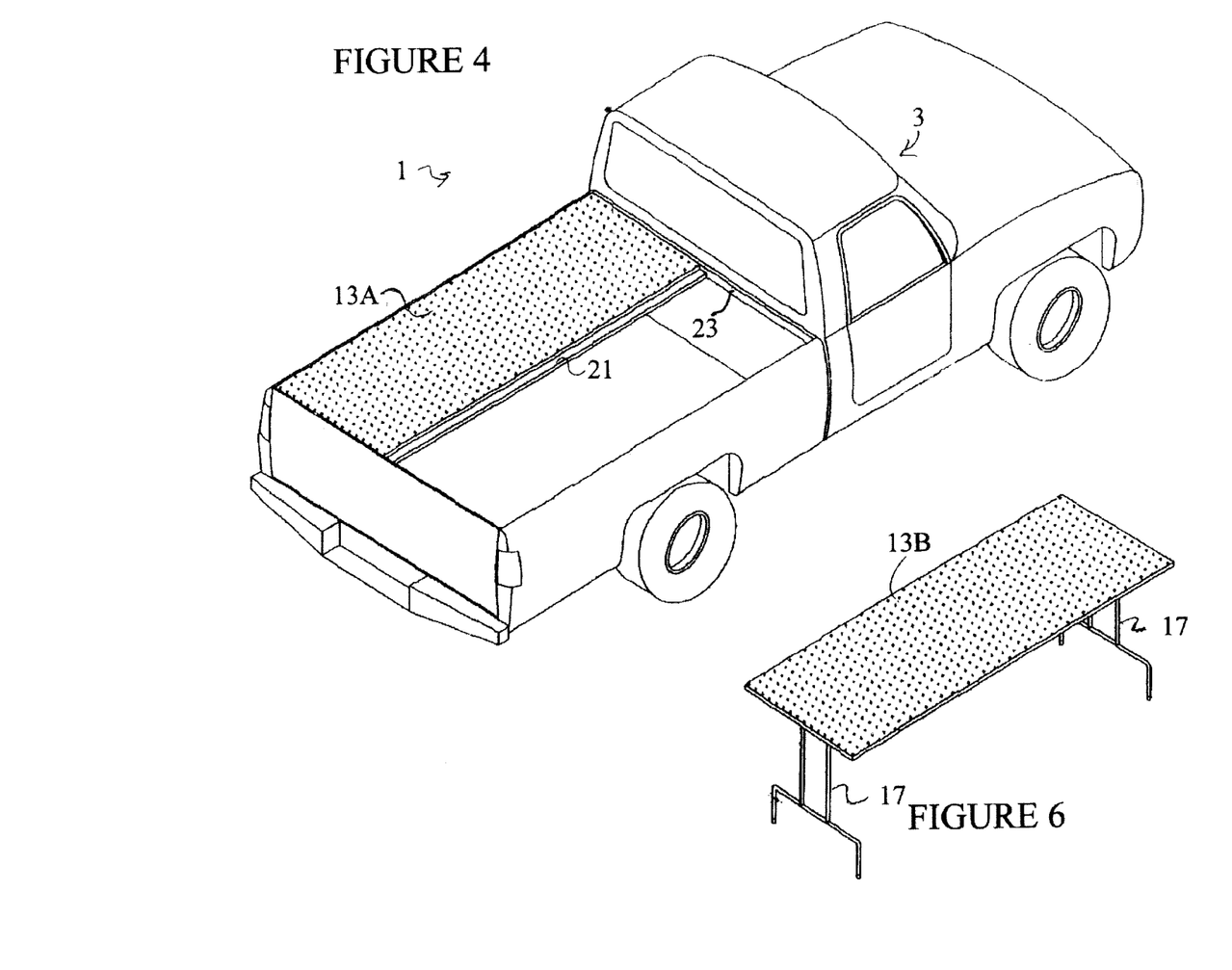
FIGS. 4, 5, and 6 are perspective views of a multi-panel embodiment of the present invention.
Figure 5:
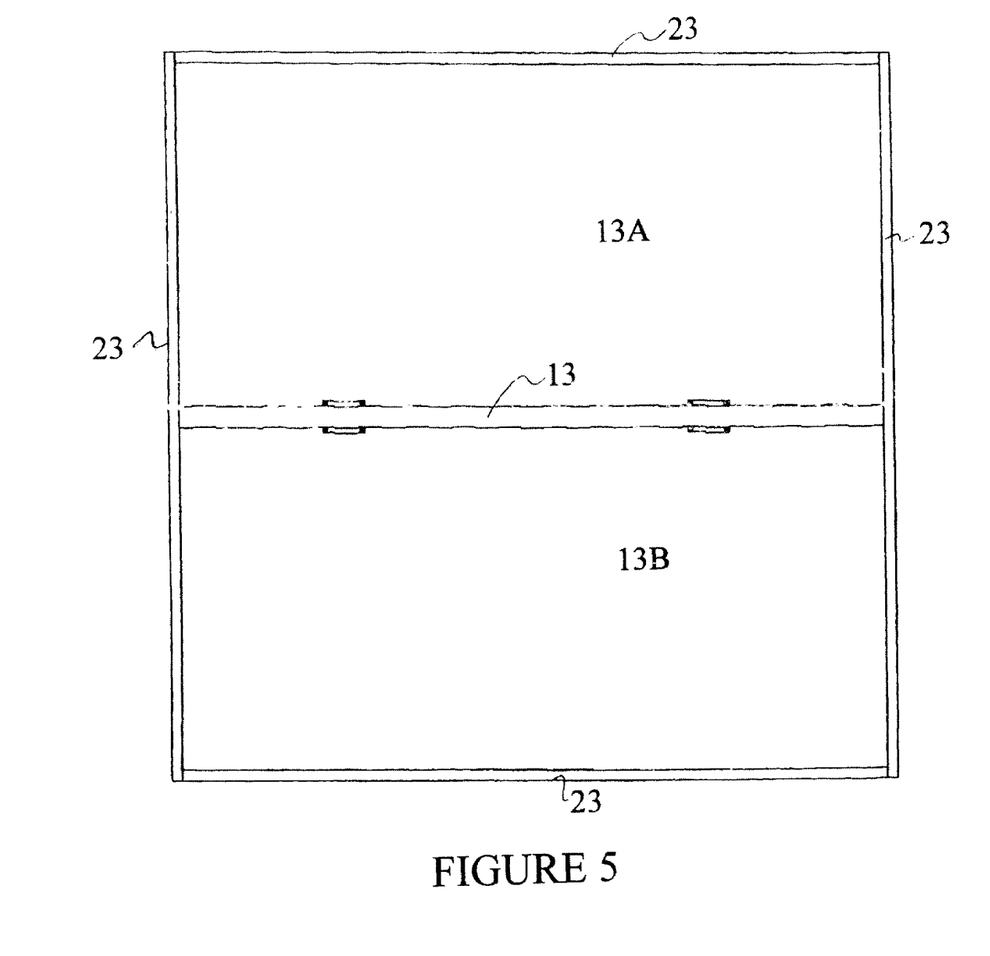

FIG. 4 is a perspective view of another embodiment of the present invention that is hinged along the central longitudinal axis of bed 5 to provide a cover that can be opened from either side of the bed to provide access. A central frame member 21 is provided extending between perimeter frame members 23 and each pangl 13A, 13B of the cover is secured by a pair of hinges to it (as shown in FIG. 5). Each panel can be removed from bed 5 (by removing the hinge pins) to form a table as shown in FIG. 6. In this embodiment, a pair of conventional, folding "banquet table" legs 25 is secured to the underside of panel 13B.

Figure 7:
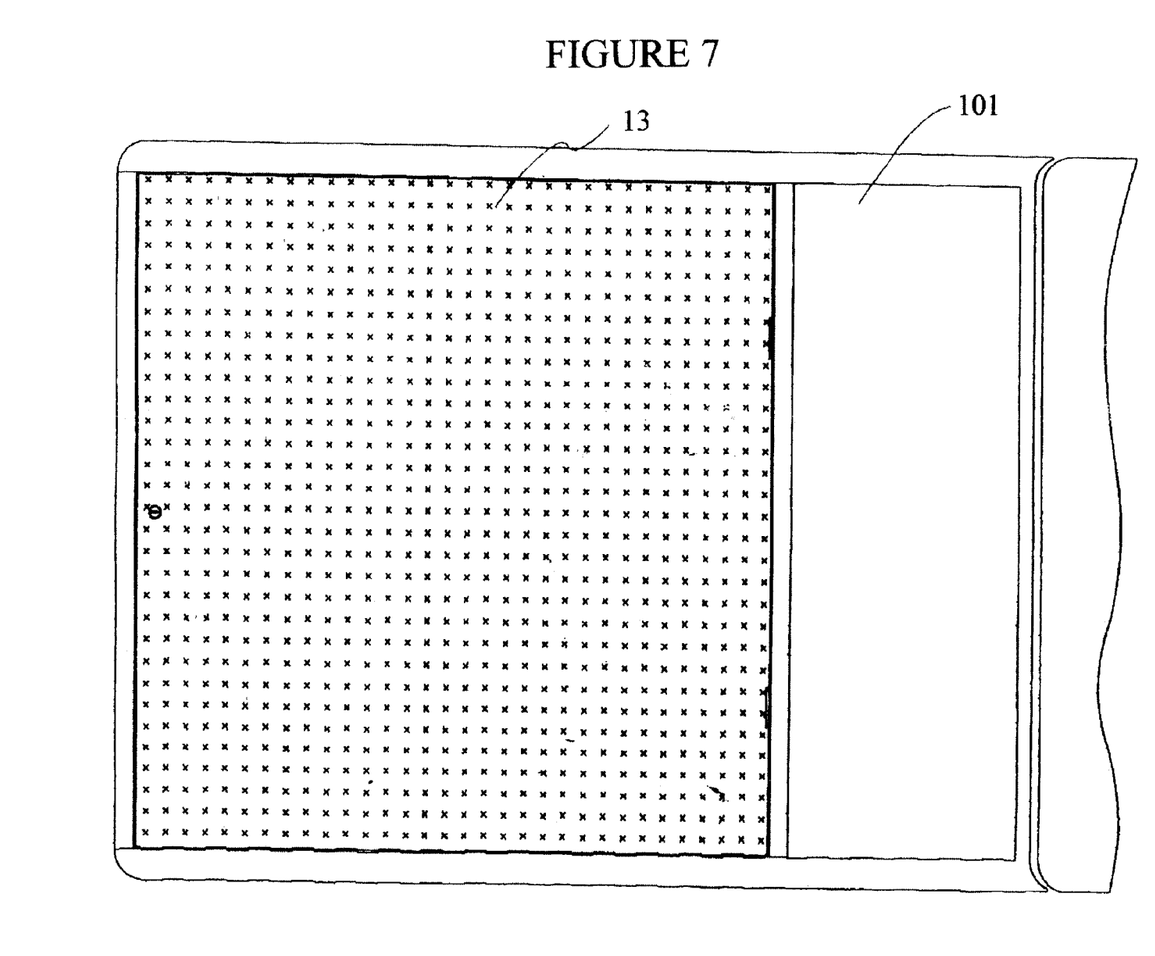
FIG. 7 is a perspective view of an embodiment of the present invention for use with a pickup bed having a tool box.

FIG. 7 is a plan view of another embodiment of the present invention that is used in conjunction with a toolbox 101. This embodiment is virtually identical to that of FIGS. 1 through 3 except that cover member 13 is not secured by hinges to endwall 9, but to a frame member adjacent the toolbox, which serves as the endwall. This embodiment can also be provided with multiple panels like the embodiments of FIGS. 4 and 8.

Figure 8:
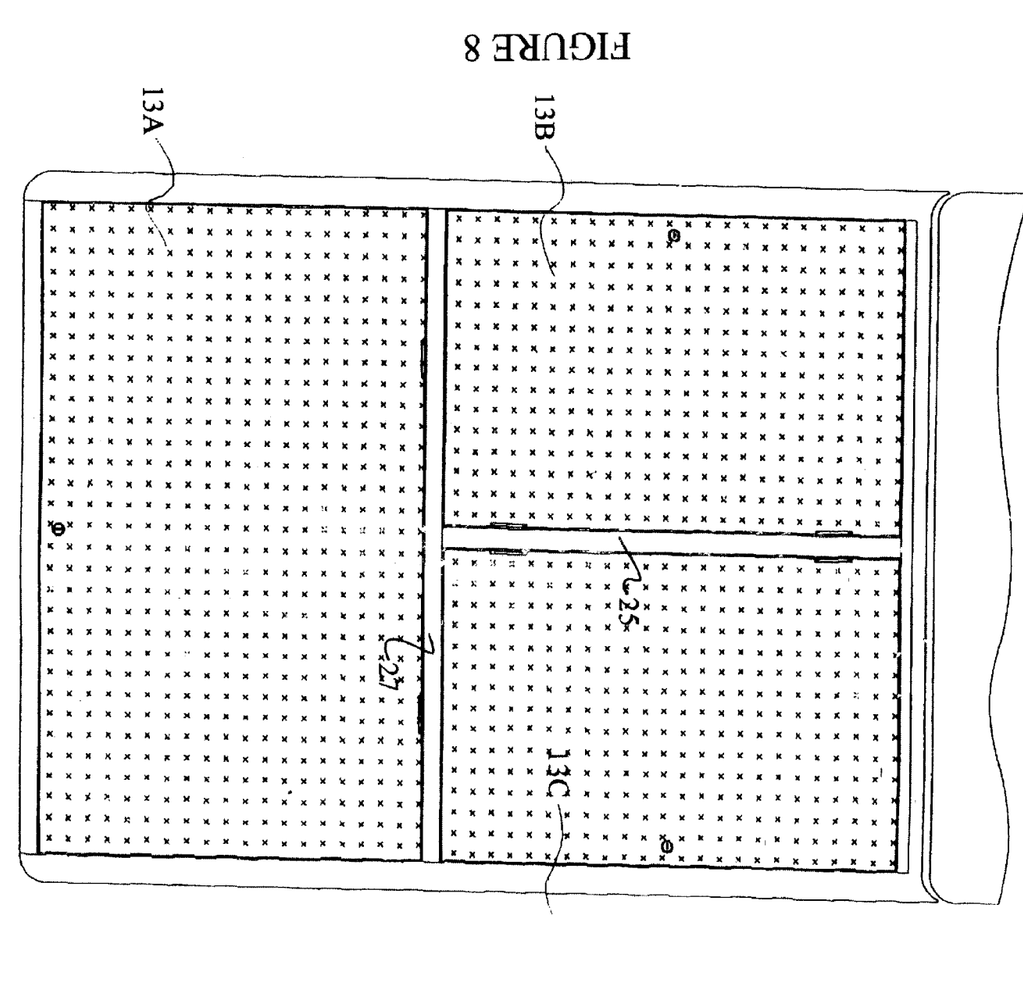
FIGS. 8 and 9 are plan views of a another multi-panel embodiment of the present invention.
Figure 9:
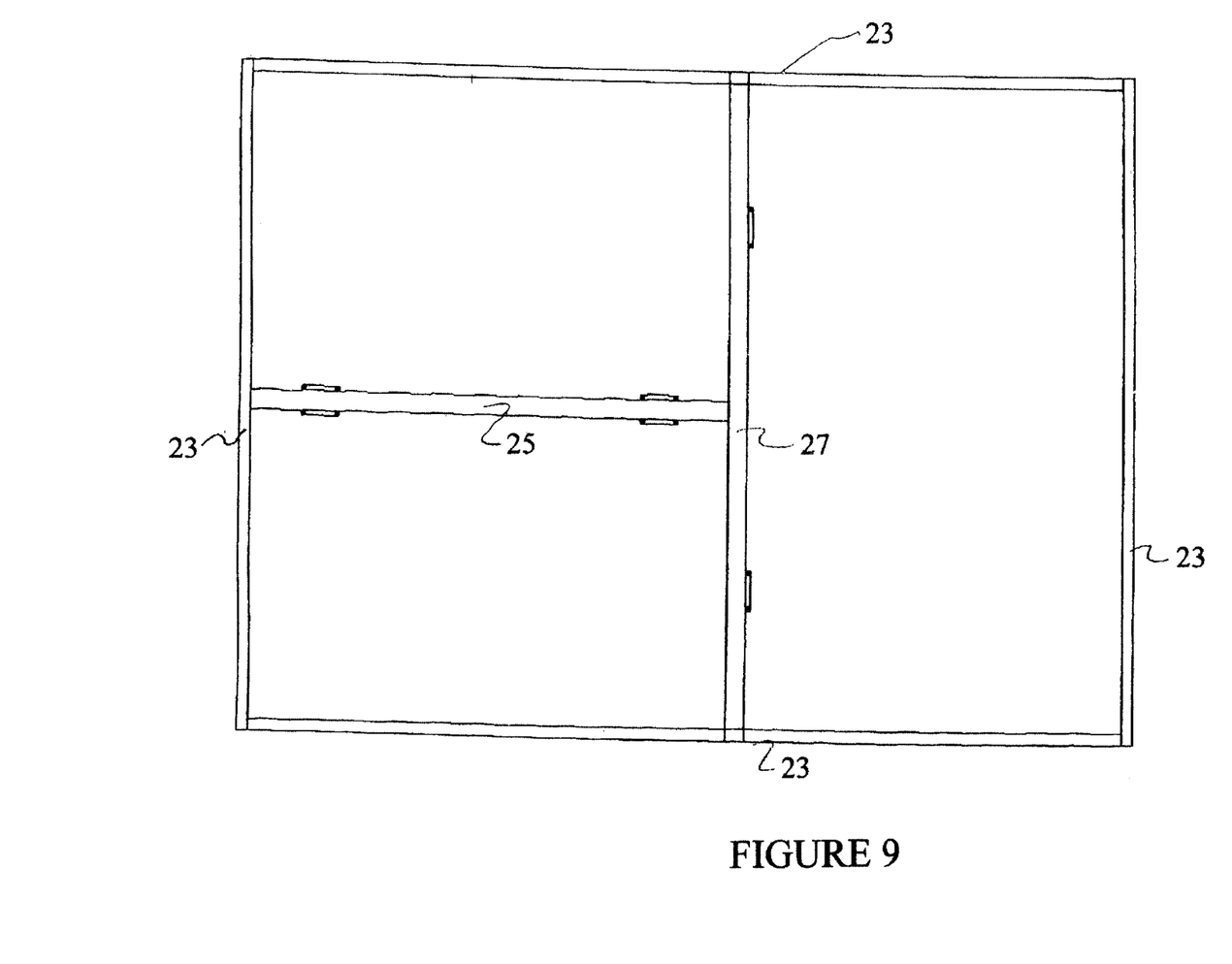

FIGS. 8 and 9 are plan views (top and bottom, in the bottom view, angle "iron" bracing and leg retaining means are not shown) of still another embodiment of the present invention in which the panels 13A, 13B, 13C of the cover member are hinged along two axes to permit access to the bed from either side near the cab or from over the tailgate. Accordingly, a central frame member 27 extends from endwall 9 to the medial portion of bed 5, and intersects another central member 29 extending between sidewalls 7. A pair of hinges connects each panel 13A, 13B, 13C to a central member as shown in FIG. 9. The hinge pins of the hinges are removable and each panel may be provided with legs as illustrated in FIGS. 3 and 6. Thus, the hinges and central members form hinge members that are axes about which panels of the cover member rotate to permit access to bed 5 from various directions in various embodiments. In the embodiment of FIG. 8, there are right and left front or forward panels 13B, 13C, and a rear panel 13A.

Figure 10:
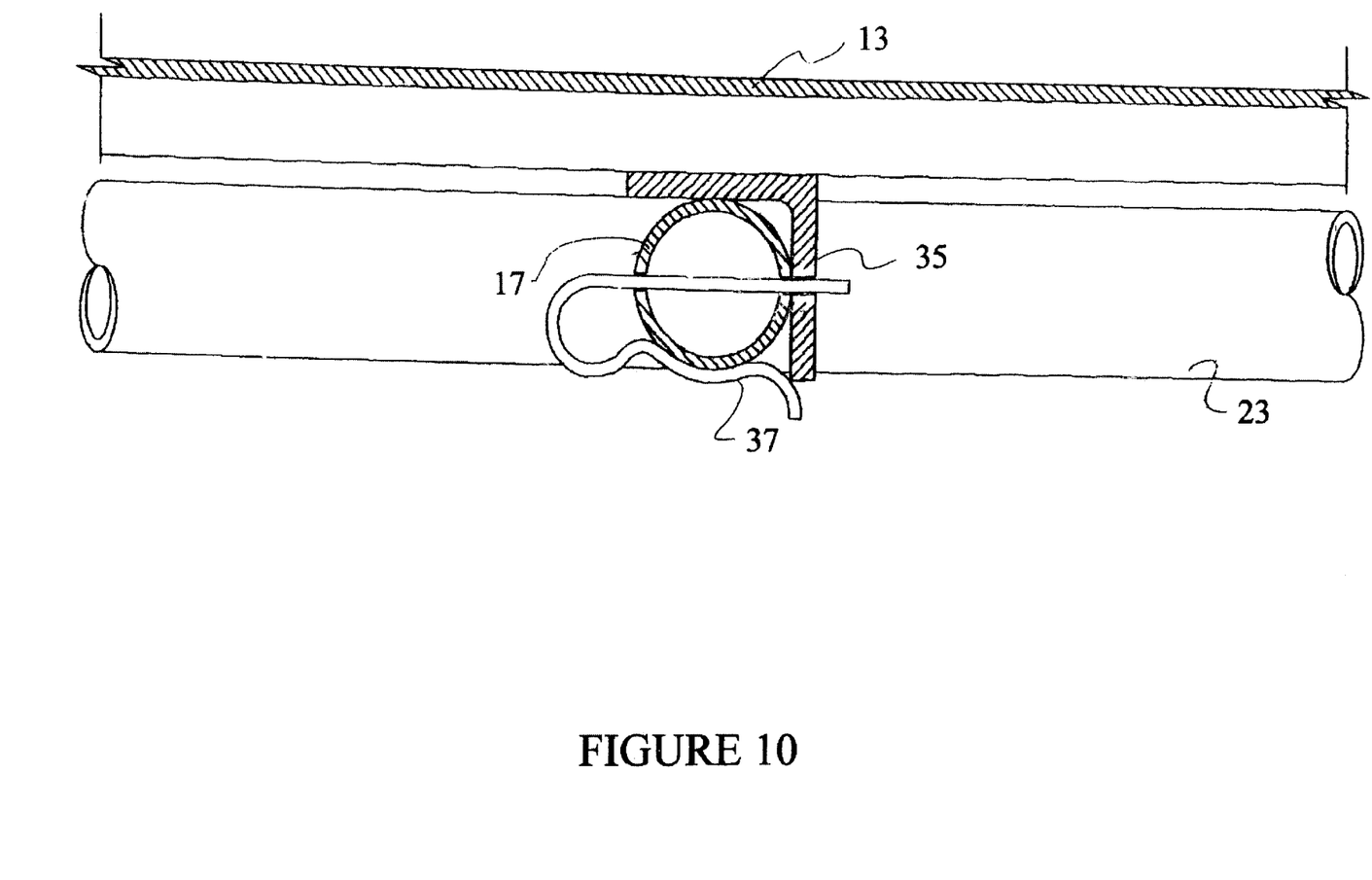
FIG. 10 is an enlarged section view of the leg retention means according to the present invention.

FIG. 10 is a partial section view of a mechanism for retaining legs 19, 25 in the folded position. A length of "angle iron" (aluminum is preferred) 35 is secured to the underside of cover member 13 and one leg is drilled with a hole or aperture. A portion of the leg member (banquet table leg 25 is illustrated) is received by angle iron and secured to it by a cotter pin 37, which registers with a hole in leg member 25 and the hole in angle iron 35. This secures the leg in a folded position but easily permits unfolding.

Figure 11:
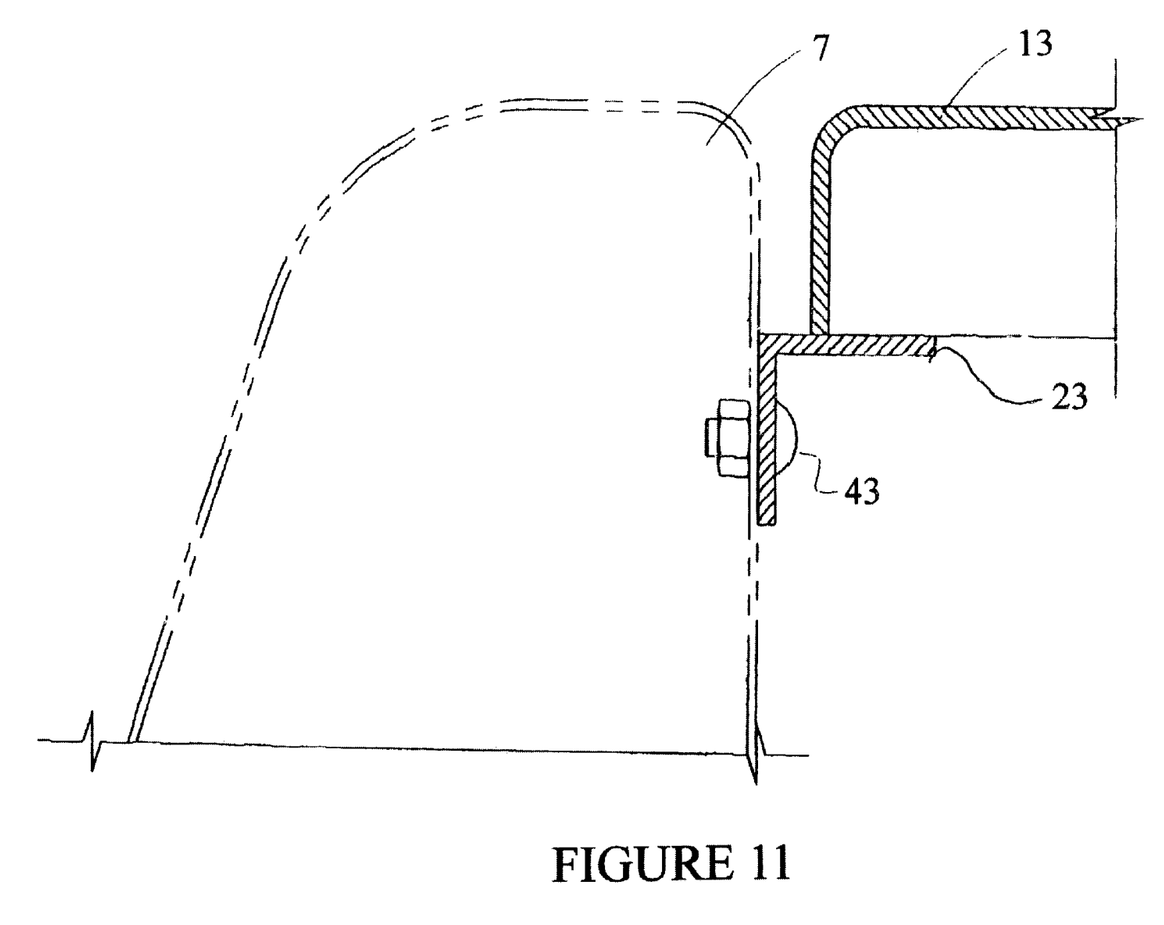
FIG. 11 is an enlarged fragmentary section view of the attachment of the perimeter frame rails according to the present invention.

FIG. 11 is a partial section view of a perimeter frame member 23, which is a length of angle iron (aluminum is preferred) secured by bolts 43 or rivets to the side- or end walls (7,9) of bed. The edges of cover member 13 (or panels 13A, 13b, 13C) rest on member 23 and cover 13 is thus flush or near-flush with the top of bed 5.

Figure 12:
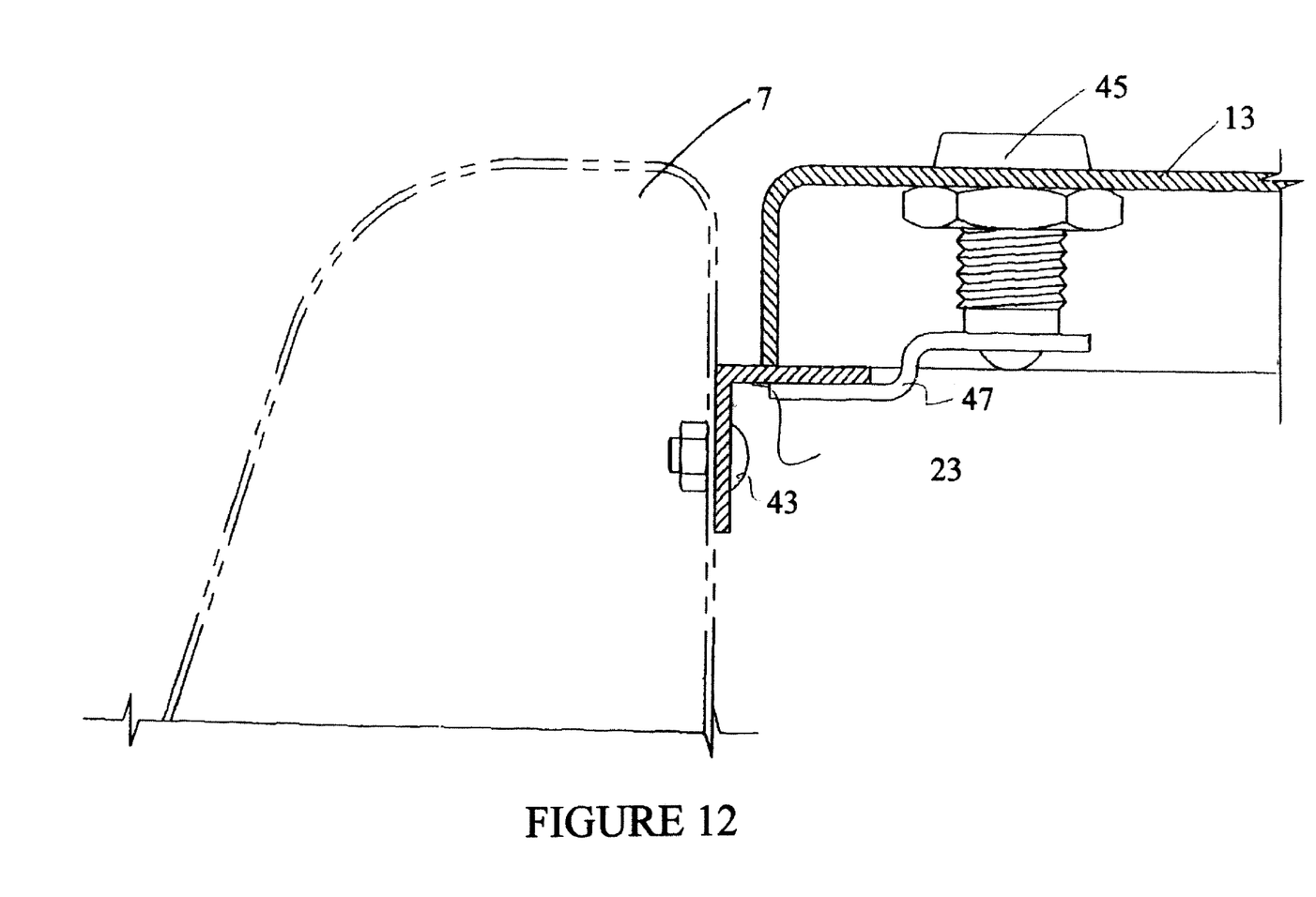
FIG. 12 is an enlarged fragmentary section view of the panel locking device in accordance with the present invention.

FIG. 12 is a partial section view of the locking mechanism employed in the present invention. As shown, a keyed rotating lock assembly 45 is inserted through an aperture in cover 13. A hasp or tongue 47 extends from assembly 45 and is rotated into and out of engagement with peripheral member to selectively lock one or more of the panels of cover member 13 in a closed position.

Figure 13:
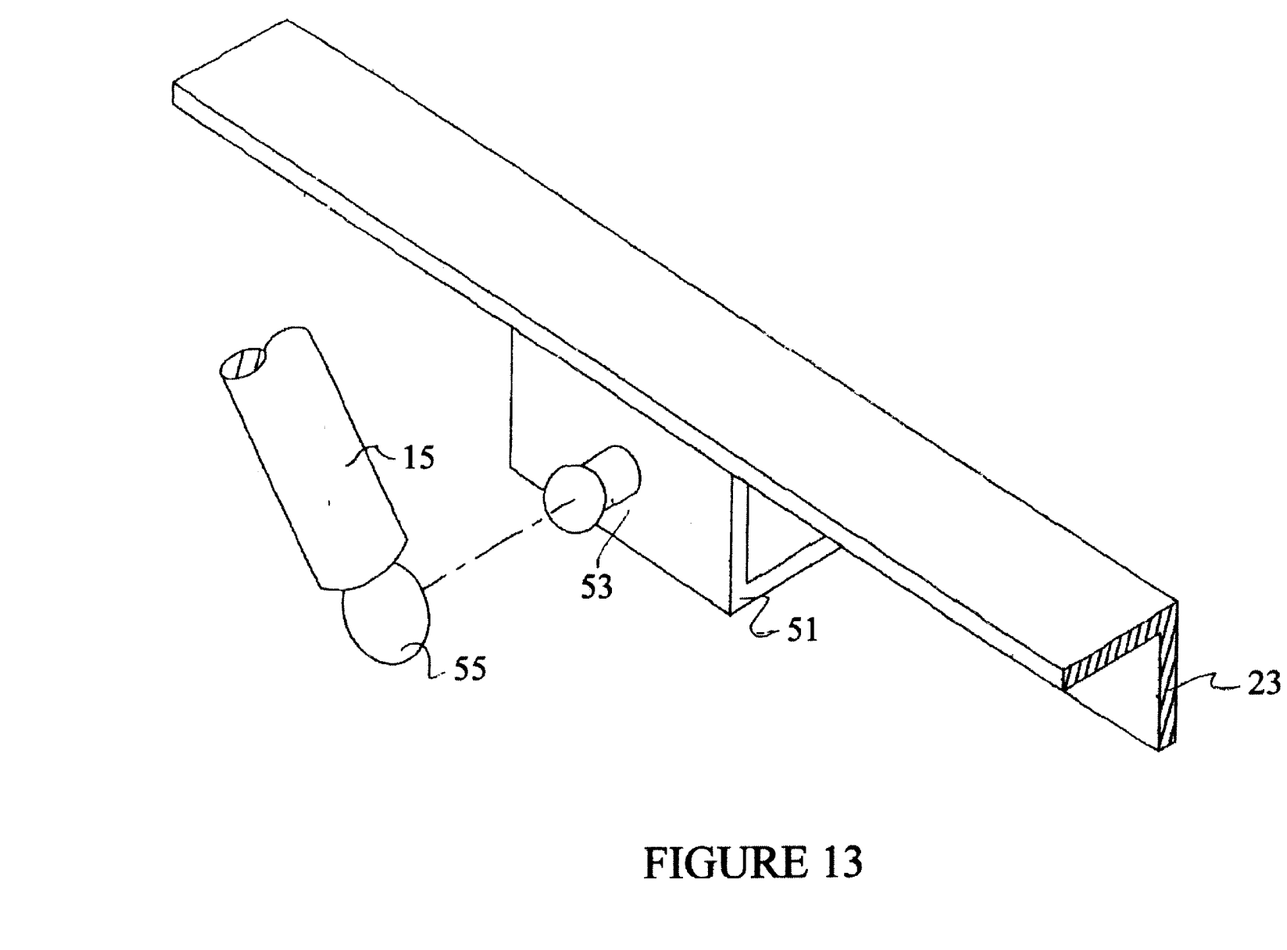
FIGS. 13 and 14 are fragmentary section views of the attachment of the gas struts to the frame and cover member in accordance with the present invention.
Figure 14:
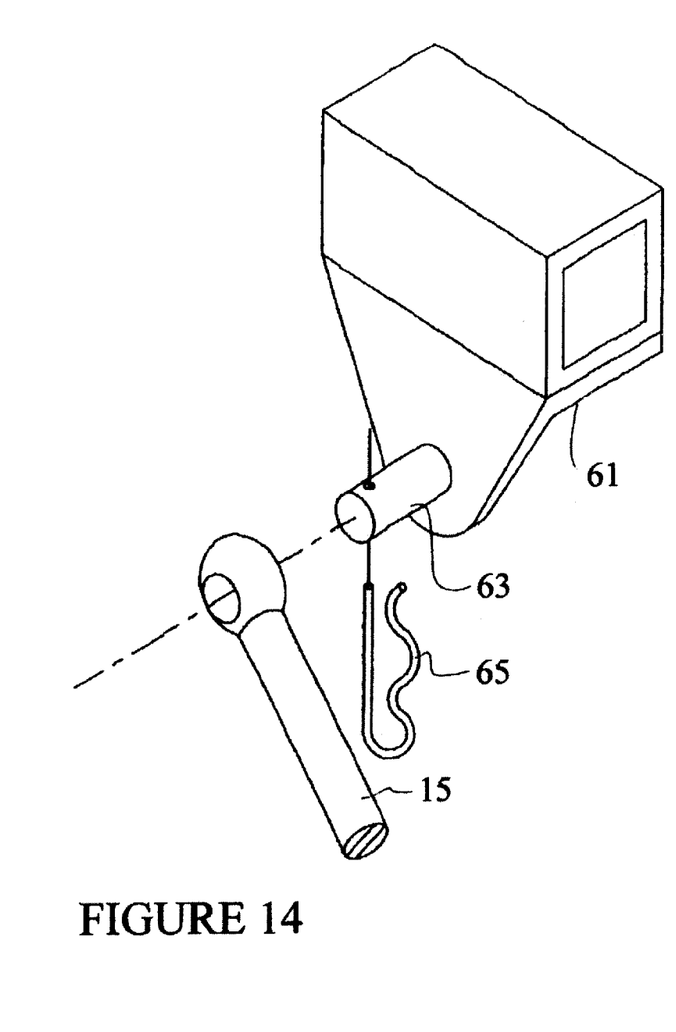

FIGS. 13 and 14 are perspective views of the attachment of gas struts 15 to cover member 13 and frame members 23. As shown in FIG. 12, a bracket of angle "iron" (aluminum is preferred) is welded or secured to frame member 25, which is secured to side-or end-wall 7,9 of bed (as described in FIG. 11). A stud with a ball at its end 53 extends from bracket 51. The lower end of strut 15 has a socket 55, that fits over and engages the ball on stud 53 to provide a rotating and self-aligning connection at the lower end of strut 15. At the upper end, as shown in FIG. 13, another bracket is secured to cover member (not shown) and a stud 63 projects from it. A ring member is provided on the end of strut 15 that registers with stud 63 and is retained there by a cotter pin 65 to provide a rotating pin connection.

Figure 15:
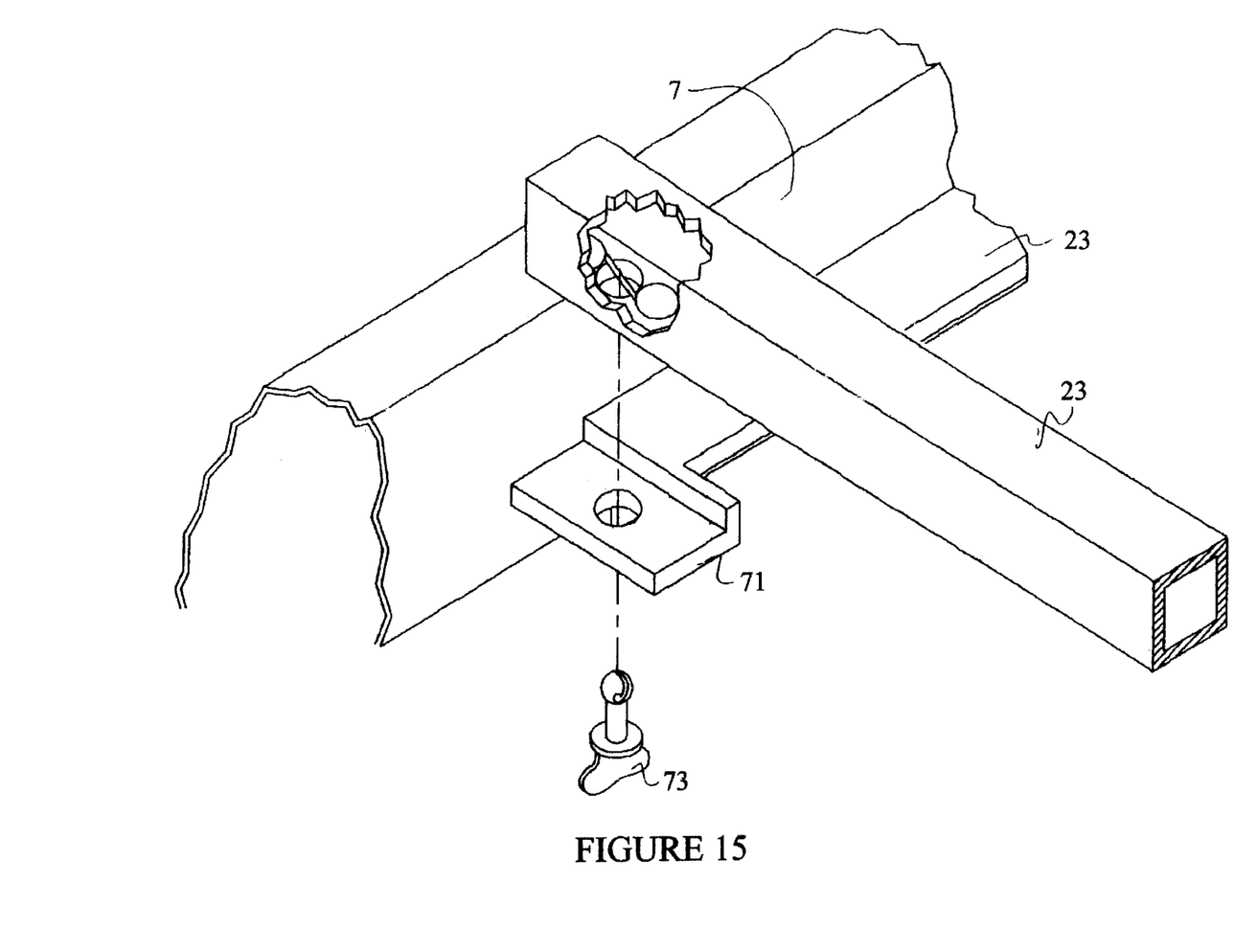
FIG. 15 is an enlarged fragmentary perspective view of the connection or coupling between perimeter frame members in accordance with the present invention.

FIG. 15 is a perspective view, partially in section, of the connection at the corners of perimeter members 25. Sidewall perimeter member 23 (coupled to sidewall 7 as show in FIG. 10) is provided at its end with a flattened section 71, with a hole bored through it. A corresponding hole is bored in cross perimeter member 23 (which is a box section). A Dzus fastener 73 is employed to couple members 23 together rigidly, but in a manner that can be disassembled easily.

Figure 16:
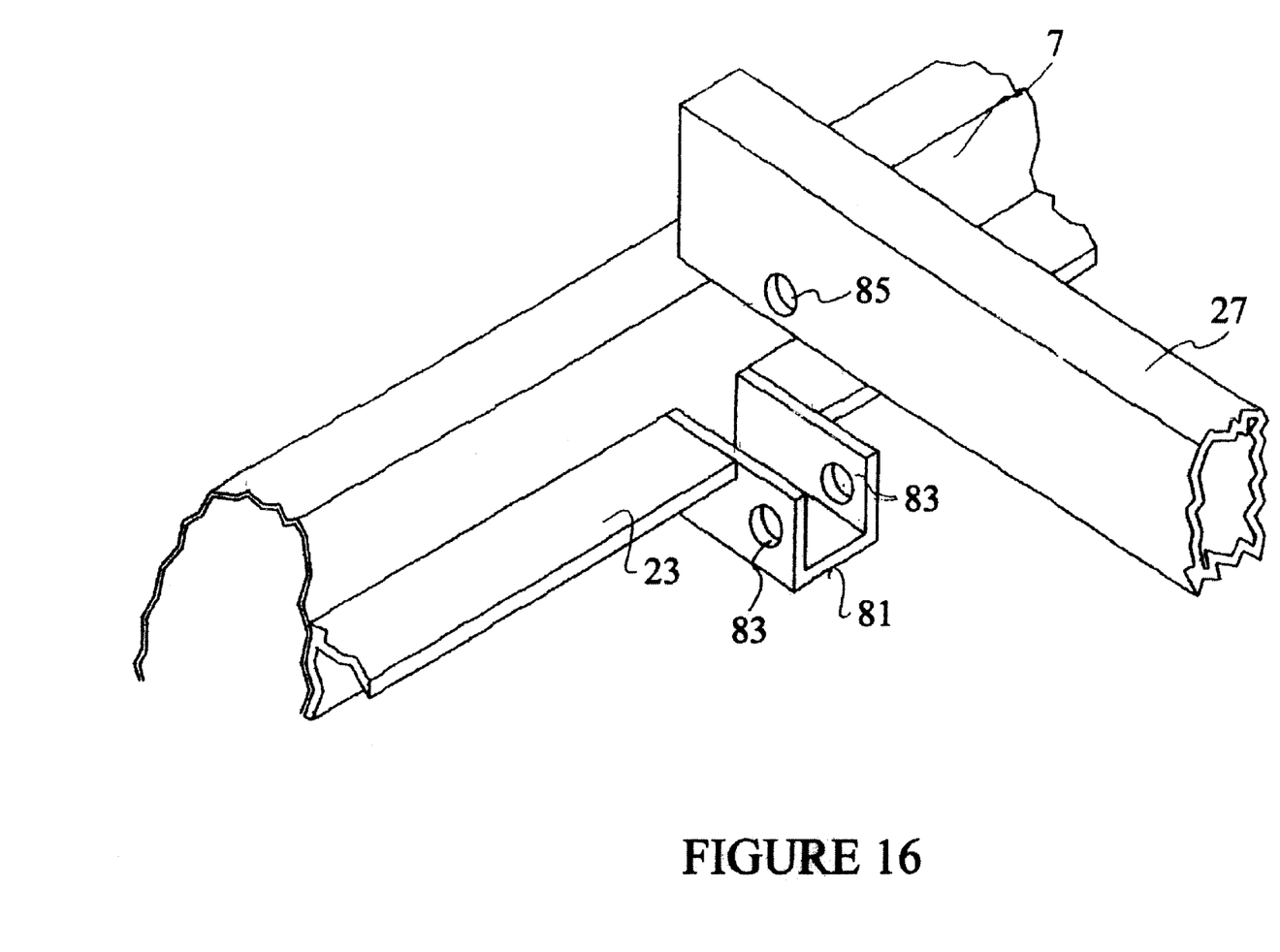
FIG. 16 is an enlarged fragmentary perspective view of the connection or coupling between perimeter and central frame members in accordance with the present invention.

FIG. 16 is a fragmentary section view of the attachment of a central frame member 29 to perimeter frame members 23. A box bracket 81, open at the top, is welded or otherwise secured to angle "iron" of perimeter member 23. A pair of coaxial holes 83 are formed in box bracket and register with corresponding holes 85 in central frame member 29. A bolt or clevis pin (not shown) is inserted through holes 83, 85 to removably secure central frame member 29 to perimeter member 23.

In operation, bed cover 13 provides a strong, secure and aerodynamic cover for the bed of a pickup. It can be used in conjunction with a toolbox or without. When removed from the pickup, bed cover 13 can be used as a work or picnic table. When in place on the bed of pickup 1, the cover provides a horizontal, load-bearing surface, such that the utility of the bed is not completely lost. The multi-panel embodiments permit access to the bed from various directions or locations around the bed.

The invention has been described with reference to preferred embodiments thereof. It is thus not limited, but is susceptible to variation and modification without departing from the scope and spirit of the invention, which is defined by the claims.

I claim:

1. A bed cover for a pickup truck having a bed with a pair of parallel, spaced-apart, upstanding sidewalls, a tailgate extending transversely between the sidewalls at one end, and an end wall extending between the sidewalls at an end opposite the tailgate, the sidewalls, end wall and tailgate defining a bed volume and an upper extent, the bed cover comprising:

a generally laminar cover member extending between the sidewalls, end wall, and tailgate substantially flush with the upper extent thereof, and removably secured to at least one of the sidewalls and end wall, the cover member being formed of a rigid material adapted to bear a load, the cover member being secured to the sidewalls in a location to leave at least 75% of the bed volume under the cover member usable for storage; and at least one leg member secured to one side of the cover member, the leg member being selectively extendable to permit use of the cover member as a table when the cover is removed from the bed of the pickup truck.

2. The pickup truck bed cover according to claim 1, wherein the end wall is defined by a vertically extending portion of a toolbox disposed in the bed opposite the tailgate.

3. The pickup truck bed cover according to claim 1, wherein the end wall is an integral portion of the pickup truck bed.

4. The pickup truck bed cover according to claim 1, further comprising:

at least one hinge member, coupled to the cover member and extending along an axis of the bed to permit partial opening of the bed cover and access to the bed volume under the bed cover.

5. The pickup truck bed cover according to claim 4, wherein the at least one hinge member comprises:

a first hinge member extending transversely between the sidewalls and coupling a forward and a rear portion of the bed cover to one another;

a second hinge member extending from the end wall perpendicular to and intersecting the first hinge member to connect right front and left front portions of the cover member to one another.

6. The pickup truck bed cover according to claim 5, wherein the first hinge member comprises a plurality of individual hinge members with removable hinge pins to permit selective removal of the cover member from the bed.

7. The pickup truck bed cover according to claim 1, wherein the cover member is formed of aluminum plate having a non-skid tread pattern formed on at least an upper surface thereof.

8. A bed cover for a pickup truck having a bed with a pair of parallel, spaced-apart, upstanding sidewalls, a tail-gate extending transversely between the sidewalls at one end, and an end wall extending between the sidewalls at an end opposite the tailgate, the sidewalls, end wall and tailgate defining a bed volume and an upper extent, the bed cover comprising:

a generally laminar cover member extending between extending between the sidewalls, end wall, and tailgate substantially flush with the upper extent thereof and removably secured to at least one of the sidewalls and end wall, the cover member being secured to the sidewalls in a location to leave at least 75% of the bed volume under the cover member usable for storage and formed of a rigid material adapted to bear a load;

at least one hinge member, coupled to the cover member and extending along an axis of the bed to permit partial opening of the bed cover and access to the bed volume under the bed cover; and at least one leg member secured to one side of the cover member, the leg member being selectively extendable to permit use of the cover member as a table when the cover is removed from the bed of the pickup truck.

9. The pickup truck bed cover according to claim 8, wherein the end wall is defined by a portion of a toolbox disposed in the bed opposite the tailgate.

10. The pickup truck bed cover according to claim 8, wherein the end wall is an integral portion of the pickup truck bed.

11. The pickup truck bed cover according to claim 8, wherein the at least one hinge member comprises:

a first hinge member extending transversely between the sidewalls and coupling forward and rear portions of the bed cover to one another;

a second hinge member extending from the end wall perpendicular to and intersecting the first hinge member to connect right front and left front portions of the cover member to one another.

12. The pickup truck bed cover according to claim 8, wherein the first hinge member comprises a plurality of individual hinge members with removable hinge pins to permit selective removal of the cover member from the bed.

13. The pickup truck bed cover according to claim 8, wherein the cover member is formed of aluminum plate having a non-skid tread pattern formed on at least an upper surface thereof.

14. A bed cover for a pickup truck having a bed with a pair of parallel, spaced-apart, upstanding sidewalls, a tail-gate extending transversely between the sidewalls at one end, and an end wall extending between the sidewalls at an end opposite the tailgate, the sidewalls, end wall and tailgate defining a bed volume and an upper extent, the bed cover comprising:

- a generally laminar cover member extending between the sidewalls, end walls, and tailgate substantially flush with the upper extent thereof, the cover member being secured to the sidewalls in a location to leave at least 75% of the bed volume under the cover member usable for storage and formed of a rigid material adapted to bear a load;
- a first hinge member extending transversely between the sidewalls and coupling forward and rear portions of the bed cover to one another;
- a second hinge member extending from the end wall perpendicular to and intersecting the first hinge member to connect right front and left front portions of the cover member to one another; and
- at least one leg member secured to one side of the cover member, the leg member being selectively extendable to permit use of the cover member as a table when the cover is removed from the bed of the pickup truck.

15. The pickup truck bed cover according to claim 14, wherein the end wall is defined by a portion of a toolbox disposed in the bed opposite the tailgate.

16. The pickup truck bed cover according to claim 14, wherein the end wall is an integral portion of the pickup truck bed.

17. The pickup truck bed cover according to claim 14, wherein the first hinge member comprises a plurality of individual hinge members with removable hinge pins to permit selective removal of the cover member from the bed.

18. The pickup truck bed cover according to claim 14, wherein the cover member is formed of aluminum plate having a non-skid tread pattern formed on at least an upper surface thereof.

* * * * *